(12) United States Patent
Audette, Jr.

(10) Patent No.: US 11,778,952 B2
(45) Date of Patent: Oct. 10, 2023

(54) SHEARING DEVICE PROVIDING A PAIR OF PINCERS FOR SECURING THE SHEARED OBJECT

(71) Applicant: Albert David Audette, Jr., Stamford, CT (US)

(72) Inventor: Albert David Audette, Jr., Stamford, CT (US)

(73) Assignee: Jeffrey B. Audette, Cumming, GA (US)

( * ) Notice: Subject to any disclaimer, the term of this patent is extended or adjusted under 35 U.S.C. 154(b) by 0 days.

(21) Appl. No.: 17/450,341

(22) Filed: Oct. 8, 2021

(65) Prior Publication Data
US 2022/0022379 A1    Jan. 27, 2022

Related U.S. Application Data

(63) Continuation-in-part of application No. 16/797,252, filed on Feb. 21, 2020, now abandoned.

(51) Int. Cl.
*A01G 3/02* (2006.01)

(52) U.S. Cl.
CPC .......... *A01G 3/02* (2013.01); *A01G 2003/023* (2013.01)

(58) Field of Classification Search
CPC .... A01G 2003/023; A01G 3/021; A01G 3/02; B26B 13/00; A01D 46/247
USPC .......................................... 30/131, 134, 135
See application file for complete search history.

(56) References Cited

U.S. PATENT DOCUMENTS

| | | | | |
|---|---|---|---|---|
| 108,091 A | * | 10/1870 | Mosher | B23D 17/00 30/134 |
| 148,488 A | * | 3/1874 | Barbour | A01G 3/02 217/19 |
| 867,514 A | * | 10/1907 | Crockett | A01G 3/02 30/341 |
| 1,775,086 A | * | 9/1930 | Bonehill | A01G 3/02 30/254 |
| 2,012,648 A | * | 8/1935 | Wheeler | A01G 3/02 30/134 |
| 2,064,105 A | * | 12/1936 | Conlee | A01G 3/02 30/134 |
| 2,086,081 A | * | 7/1937 | Hollenbeck | A01G 3/02 D8/4 |
| 4,348,808 A | * | 9/1982 | Nalbandyan | A01D 46/247 30/134 |
| 4,464,837 A | * | 8/1984 | Amstutz | A01G 3/0475 30/134 |
| 5,398,415 A | * | 3/1995 | Collins, Jr. | B26B 13/22 30/124 |
| 6,647,627 B2 | * | 11/2003 | Nickel | B26B 13/22 30/135 |

FOREIGN PATENT DOCUMENTS

| | | | | |
|---|---|---|---|---|
| DE | 4302136 A1 | * | 9/1993 | ............ A01G 3/02 |
| FR | 651913 A | * | 3/1929 | |

* cited by examiner

*Primary Examiner* — Jennifer S Matthews
(74) *Attorney, Agent, or Firm* — Dunlap Bennett & Ludwig, PLLC

(57) ABSTRACT

A hand-operated, two-blade shearing device providing a pincer post operatively associated with each blade, the two pincers post being dimensioned and adapted to work in concert to securely pinch and hold the object sheared by the two blades during the shearing action.

7 Claims, 4 Drawing Sheets

SHEARING DEVICE PROVIDING A PAIR OF PINCERS FOR SECURING THE SHEARED OBJECT

CROSS-REFERENCE TO RELATED APPLICATION

This application claims the benefit of priority of U.S. non-provisional application Ser. No. 16/797,252, filed 21 Feb. 2020 as a Continuation in Part thereof, the contents of which are herein incorporated by reference.

BACKGROUND OF THE INVENTION

The present invention relates to gardening tools and, more particularly, to a hand-operated, two-blade shearing device providing a pincer operatively associated with each blade, the two pincers being dimensioned and adapted to securely pinch and hold an object sheared by the two blades.

It can be a challenge to cut and prune a single delicate, dying blossom amongst other blossoms on the same stem without brushing or damaging the other, contiguous blossoms. Current pruning devices such as common scissors or tweezers do not keep the cut blossom from falling among its contiguous blossoms. This can be highly problematic for very delicate blossoms, such as the blossoms of African Violets and roses, that densely cluster into many buds on a single delicate stem, wherein the slightest disturbance can damage such blossoms. Also, when reaching in to retrieve a severed dead blossom, it is impossible not to touch contiguous blossoms, leaves or stems. Reaching into blossoms will bruise other blooms and leaves, thereby damaging the viable life of the plant. Furthermore, reaching for the severed stem into the body of the plant and among other thorny stems can also be painful and frustrating experience.

Tiny scissors, finger-nail scissors or tweezers are currently used. But, the result of these makeshift approaches is typically the same: the severed flower always falls within/among its contiguous blooms and must be retrieved with a tweezer or fingers.

As can be seen, there is a need for a hand-operated, two-blade shearing device providing a pincer operatively associated with each blade, the two pincers being dimensioned and adapted to work in concert to securely pinch and hold an object sheared by the two blades. The shearing device cuts and prunes a single delicate dying blossom from those on the same stem without brushing or separating its contiguous blossoms as well as not letting the severed blossom fall into the plant proper, thus saving the plant—i.e., the other blossoms, stems and leaves—from bruising. The vertically oriented pincer on each blade is dimensioned and adapted to securing engage the cut stem, at the time of cutting, so that the cut stem can be removed without falling into the plant and so does not disturb or bruise the other portions of the plant.

SUMMARY OF THE INVENTION

In one aspect of the present invention, a shearing device includes the following: a first blade and second blade operatively associated with a pivot and opposing handles for moving between an open position and a closed position shearing objects between the first and second blades; the first and second blades have a first and second sharpened edge, respectively; a first pincer post disposed in an orthogonal orientation relative to the first blade; a second pincer post disposed in an orthogonal orientation relative to the second blade; and each pincer post having an operative surface inward of the sharpened edge by a predetermined distance.

In another aspect of the present invention, the shearing device includes the following: a first blade and second blade operatively associated with a pivot and opposing handles for moving between an open position and a closed position shearing objects between the first and second blades; the first and second blades have a first and second sharpened edge, respectively; a first pincer post disposed in an orthogonal orientation relative to the first blade; a second pincer post disposed in an orthogonal orientation relative to the second blade; each pincer post having an operative surface inward of the sharpened edge by a predetermined distance, wherein each operative surface faces the other, wherein each operative surface is generally planar and comprises a plurality of serrations; an arm extending between a distal end and a proximal end; the proximal end spaced apart from the second blade; the second pincer post extending from the proximal end away from the second blade; a space between the second blade and the proximal end, a distance of the space equal or greater than a distance associated with a thickness of the first sharpening edge; and the distal end connected to the second blade adjacent a trailing edge thereof, whereby the first sharpened edge slides between the proximal end and the second sharpened edge in the closed position, and the operative surfaces move to a secure engagement.

In yet another embodiment, the shearing device includes a first blade and second blade operatively associated with a pivot and opposing handles for moving between an open position and a closed position shearing objects between the first and second blades; a first pincer post operatively associated with the first blade; a second pincer post operatively associated with the second blade, wherein each pincer post has a generally uniform cross section as said pincer post extends generally orthogonal relative to the associated blade; and each pincer post having an operative surface inward of the sharpened edge by a predetermined distance. By 'generally uniform cross section' it is understood that cross section does not change more than ninety-five percent along the entirety of its length (this does not include its arm 25, if it has one). It is understood that 'generally orthogonal' it is understood that the pincer post has an angle of incident relative to the blade between eight-five and ninety-five degrees.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a hand-operated, two-blade shearing device providing a pincer operatively associated with each blade, the two pincers being dimensioned and adapted to work in concert along with the shearing to also securely pinch and hold the object sheared by the two blades.

Figure 1:
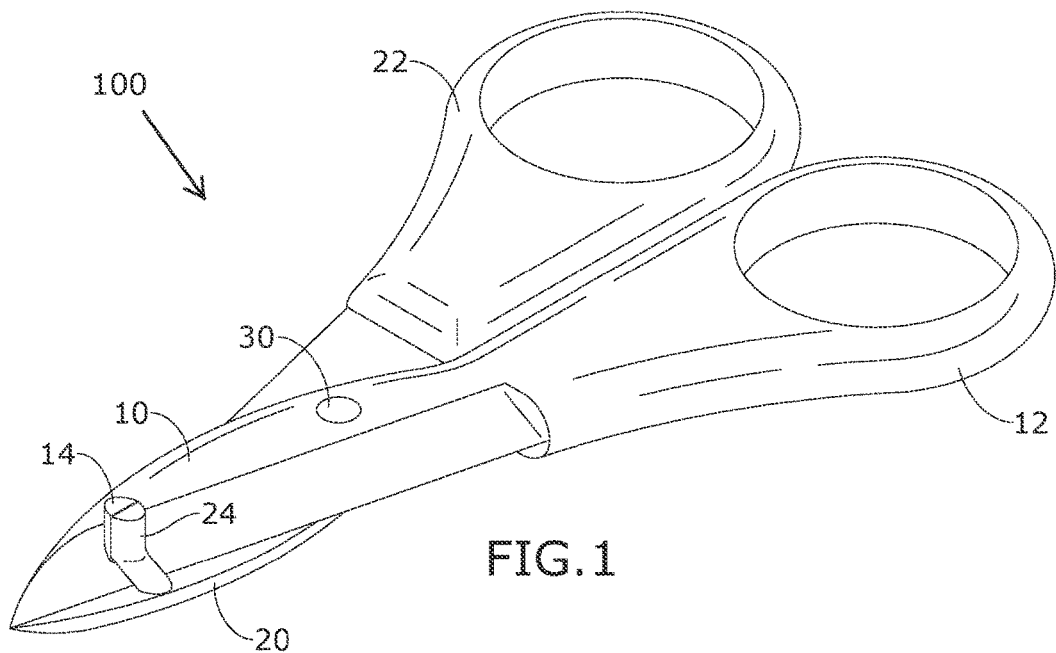
FIG. 1 is a perspective view of an exemplary embodiment of the present invention in a closed position.
Figure 2:
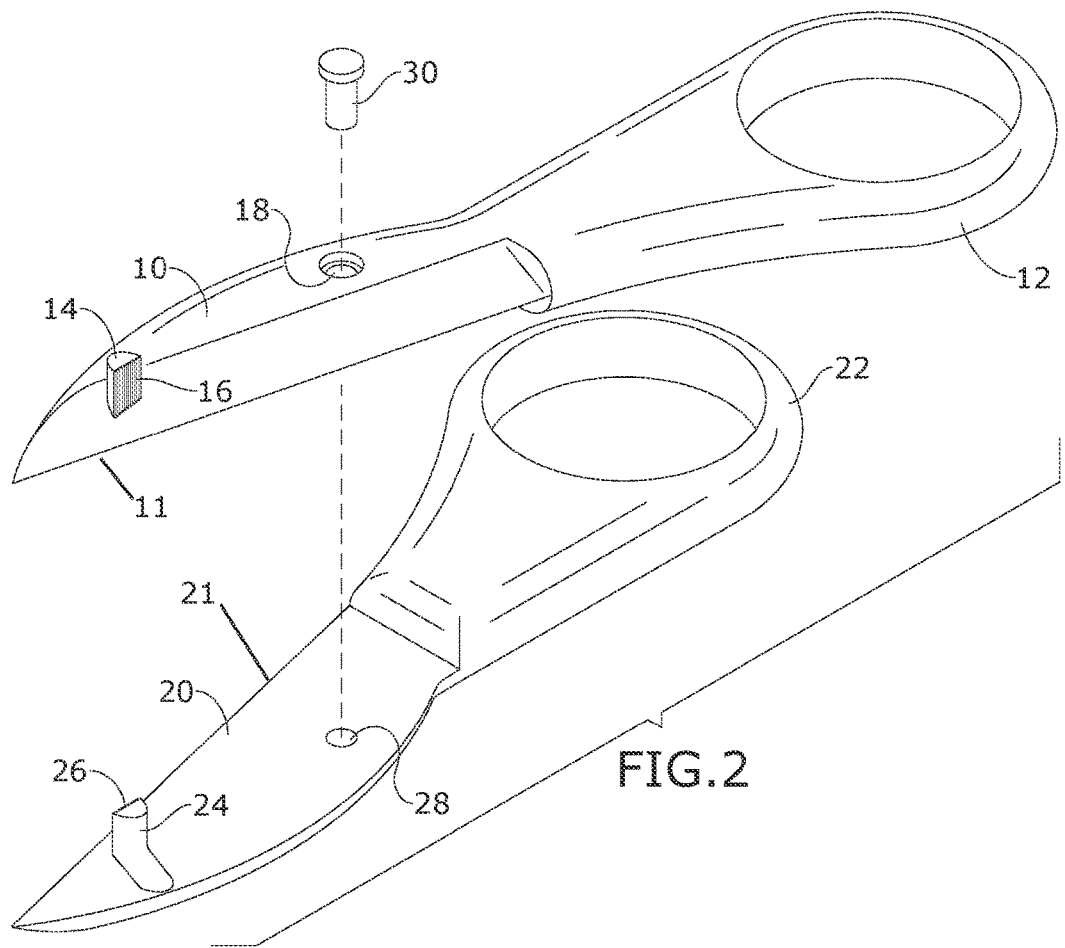
FIG. 2 is an exploded perspective view of an exemplary embodiment of the present invention.
Figure 3:
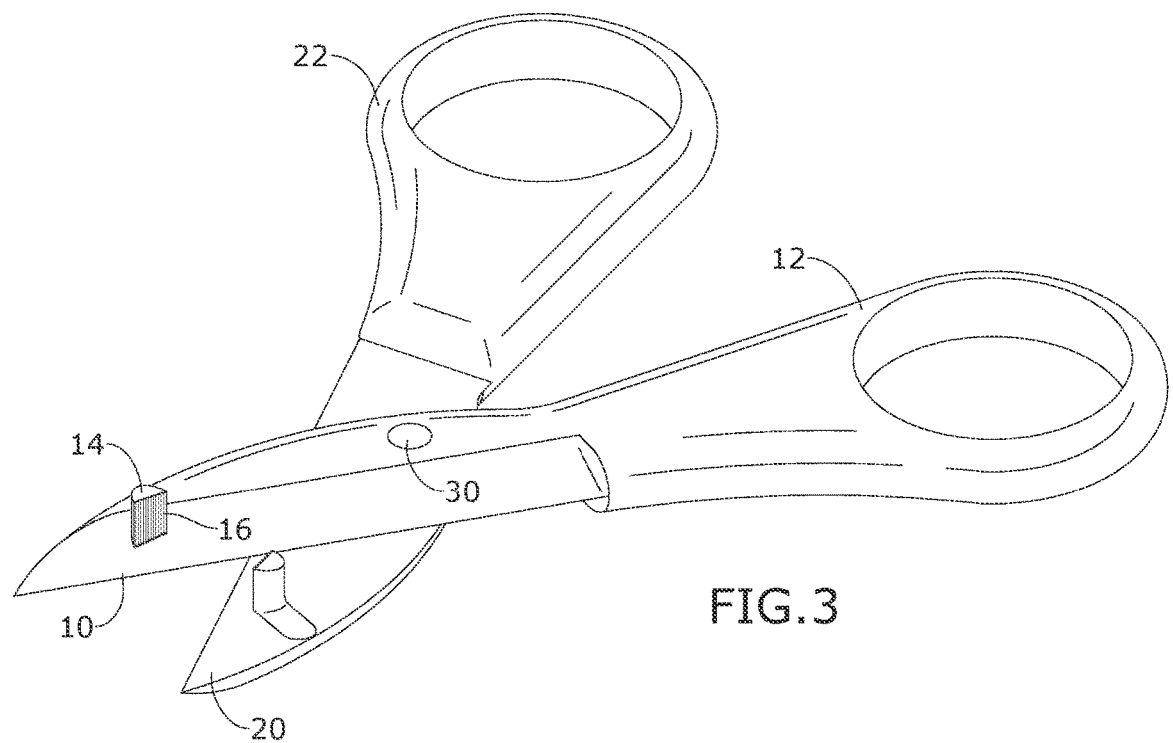
FIG. 3 is a front perspective view of an exemplary embodiment of the present invention in an open position.
Figure 4:
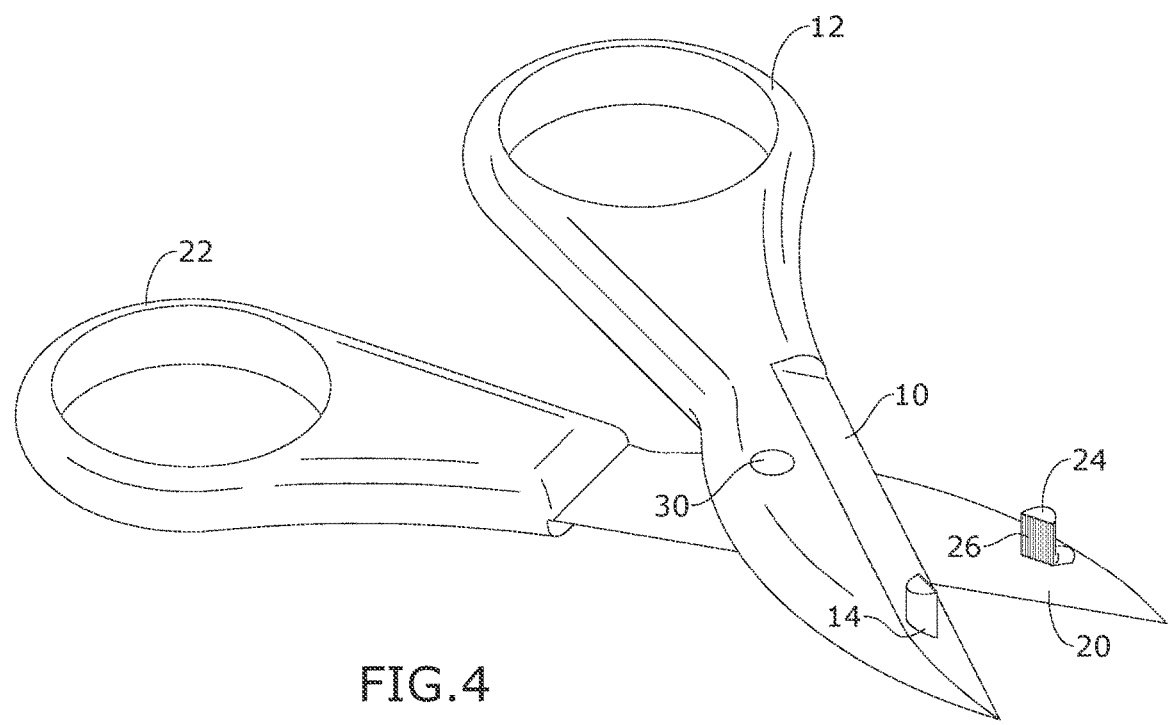
FIG. 4 is a rear perspective view of an exemplary embodiment of the present invention in the open position.
Figure 5:
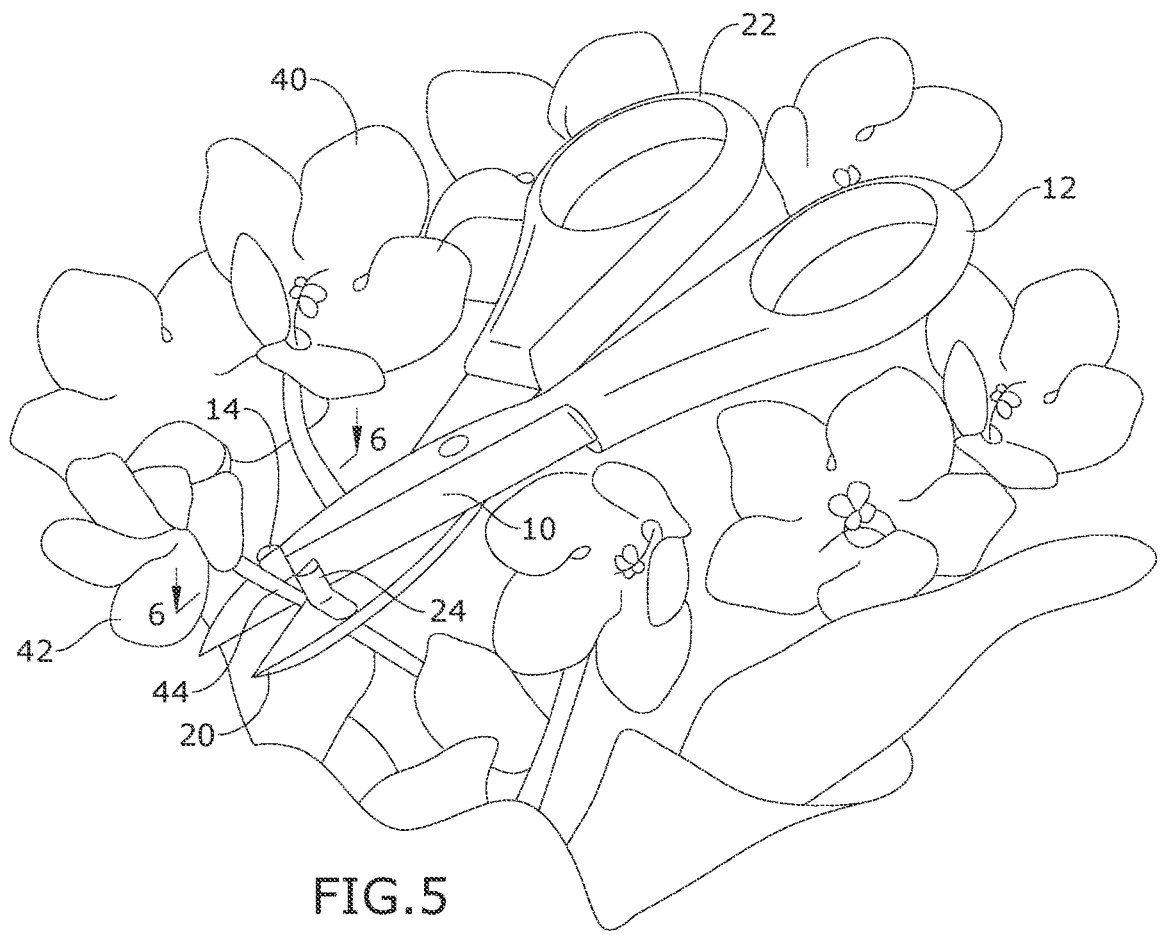
FIG. 5 is a perspective view of an exemplary embodiment of the present invention shown in use.
Figure 6:
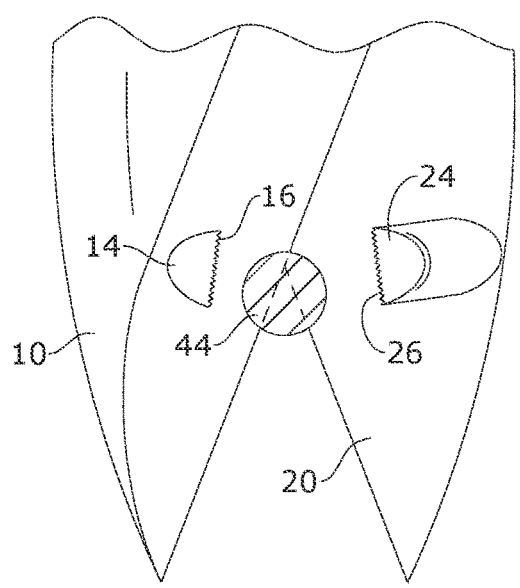
FIG. 6 is a section view of an exemplary embodiment of the present invention, taken along line 6-6 of FIG. 5, showing the first and second blades 10 and 20 cutting a stem 44.

It should be understood by those skilled in the art that the use of directional terms such as downward and the like are used in relation to the illustrative embodiments as they are depicted in the figures, the downward direction (bottom) being toward the bottom of the corresponding figures; specifically, FIGS. 3 and 4, where downward is toward the bottom of FIGS. 3 and 4. The upward directions being directed toward the top of FIGS. 3 and 4.

Referring to FIGS. 1 through 9, the present invention may include a hand-operated shearing device 100 having a first blade 10/60 and a second blade 20/60 pivotably connected about a pivot 30/70 so that the respective sharpened edges 11 and 21 slide against each other when the first and second handles 12/52 and 22/62, respectively, opposite to the pivot 30/70 are closed. The pivot 30/70 may be a pin operatively housed in a pin slot 28. The first and second blade 10/60 and a second blade 20/60 and handles 12/52 and 22/62 may be various lengths and shapes as long as they function in accordance with the disclosure herein.

A first pincer post 14/54 is disposed orthogonally from the first blade 10/50 a predetermined distance inward of the first sharpened edge 11, while a complementary second pincer post 24/64 is disposed orthogonally from the second blade 20/60 a predetermined distance inward of the second sharpened edge 21. In certain embodiments, the first pincer post 14/54 may extend vertically from the first blade 10, while the second pincer post 24/64 may be connected to an arm 25 spaced apart from the second blade 20/60 at the location of the second pincer post 24/64. The spaced apart distance may be equal or greater than a distance associated with a thickness of the first sharpened edge 11, thereby allowing the first sharpened edge 11 to slide between the arm 25 and the second blade 20/60. The arm 25 may have a distal end that tapers downward to connect to the second blade 20/60 adjacent to or just inward of the trailing edge 27 of the second blade 20/60 (opposite the leading, sharpened edge 21).

In certain embodiments, the pincer posts 14, 24, 54, and 56 may have a length greater than a width. Specifically, the direction the pincer posts 14, 24, 54, and 56 extend from the upward-facing surfaces of the blades 20/60 is the length along a longitudinal axis. The length may be a length distance that is from more than one to five or more times a width distance of the width. The width distance (i.e., in certain embodiments, the distance orthogonal to the longitudinal axis) may be one-one sixteenth of an inch to one inch.

In certain embodiments, the pincer posts 14, 24, 54, and 56 may extend only orthogonal to the (upward-facing surfaces of the) blades 20/60. Furthermore, it is understood that even though portions of the pincer posts 14, 24, 54, and 56 (like the rear surface) may or may not be non-linear shapes, the pincer posts 14, 24, 54, and 56 may extend along their longitudinal axis in such a ways that they generally maintain a consistent or uniform cross section, wherein the longitudinal axis may or may not be only orthogonal to the surface of the blades 20/60. The direction of the length distance may also be considered vertical or upward.

Figure 7:
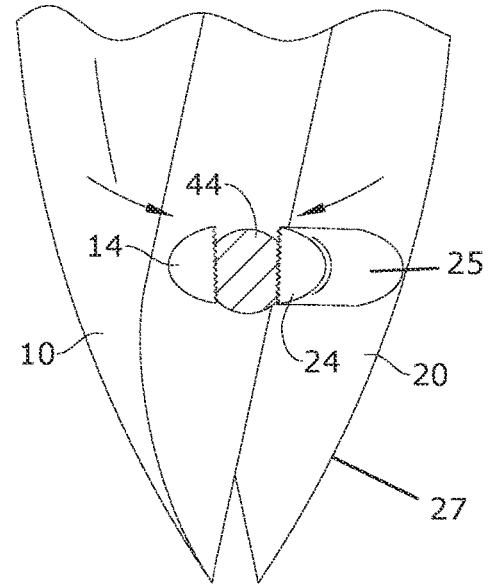
FIG. 7 is a section view of an exemplary embodiment of the present invention, taken along line 6-6 of FIG. 5, showing the present invention moving to the closed position so that the first and second pincer posts 14 and 24 secure the cut stem 44 in a secure engagement.
Figure 8:
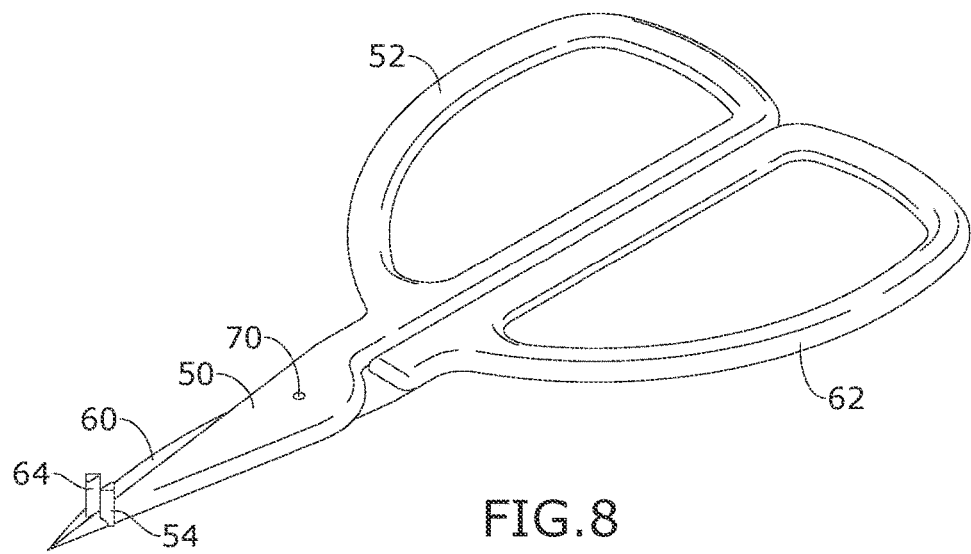
FIG. 8 is a perspective view of an exemplary embodiment of the present invention.
Figure 9:
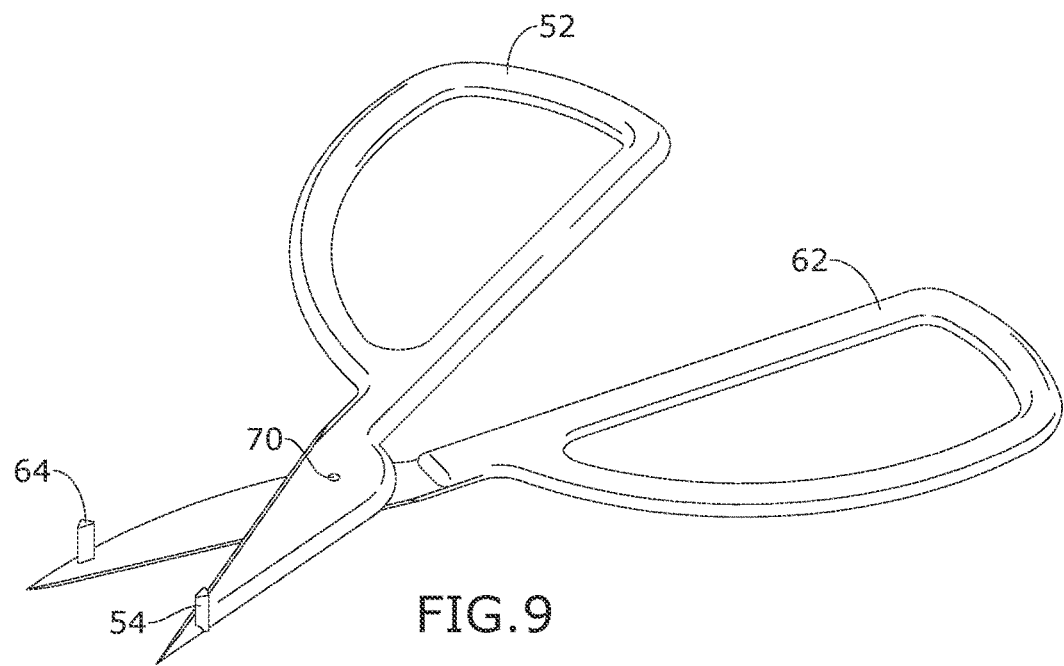
FIG. 9 is a perspective view of an exemplary embodiment of the present invention, in the open position.

The first and second pincer posts 14/54 and 24/64 provide operative surfaces 16 and 26, respectively, each having a plurality of serrations or protrusions for gripping. The operative surfaces 16 and 26 may be otherwise planar and facing each other in a closed position. The operative surfaces 16 and 26 may be inward of their respective sharpened edge 11, 21 a predetermined distance of one-sixteenth to one-eighth of an inch so that just prior to a stem 44 being cut completely through by the first and second sharpened edges, 11 and 21, both operating surfaces 16 and 16 are engaging opposing circumference points of said stem 44, as illustrated in FIG. 7. The sharpened edge 11 and 21, may provide a notch adjacent its respective pincer post for identifying the optimal point along the sharpened edges 11 and 21 to engage the stem 44 in a secure engagement.

A method of using the present invention may include the following. The hand-operated shearing device 100 disclosed above may be provided. A user interested in cutting a dead flower 42 of a plant 40 could cut the stem 44 to facilitate the bloom of the next rose by using the hand-operated shearing device 100. The user would align the stem 44 between the first and second pincer post 14/54 and 24/64 and manipulate the handles 12/52 and 22/62 to shear the stem 44 while also securing the severed stem 44 between the two operating surfaces 16, 26 of the first and second pincer post 14/54 and 24/64. From there, the user can lift the shearing device 100 and thus the severed stem 44 and dead flower 42 in the secured engagement to properly dispose thereof.

Additionally, the present invention can be used to cut grapes from a vine without dropping the severed clusters. Alternatively, the present invention could be used to clamp a small artery while cutting contiguous tissue or used during other cut-and-grip surgical procedures.

It should be understood, of course, that the foregoing relates to exemplary embodiments of the invention and that modifications may be made without departing from the spirit and scope of the invention as set forth in the following claims.

What is claimed is:

1. A shearing device for pinching a single stem within a cluster of stems, the shearing device comprising:
   a first blade and second blade operatively associated with a pivot and opposing handles for moving between an open position and a closed position shearing the single stem between the first and second blades;
   a first pincer post operatively associated with the first blade;
   a second pincer post operatively associated with the second blade, wherein each pincer post extends generally orthogonal relative to the associated blade for a longitudinal length that is at least twice the width of the pincer post;

each pincer post having an operative surface inward of the sharpened edge;

the second pincer post comprising an arm having a distal end connected to the second blade adjacent a trailing edge thereof;

a proximal end of the arm spaced apart from the second blade so that the first sharpened edge slides between the proximal end and the second sharpened edge in the closed position, and the operative surfaces move to pinch the single stem;

the second pincer post extends generally orthogonal from the proximal end; and wherein an uppermost portion of the arm is substantially below an uppermost portion of the second pincer post to minimize disturbing the other stems in the cluster of stems when pinching the single stem.

2. The shearing device of claim 1, wherein each operative surface faces the other.

3. The shearing device of claim 1, wherein a distance from each operative surface to the sharpened edge is between one-eighths and three-eighths of an inch.

4. The shearing device of claim 1, wherein each operative surface is generally planar and comprises a plurality of serrations.

5. The shearing device of claim 1, wherein the longitudinal length of each pincher post is up to one inch.

6. The shearing device of claim 1, wherein each pincer post has a generally uniform cross section.

7. The shearing device of claim 4, wherein the serrations are vertically oriented.

* * * * *